(12) United States Patent
DelRegno et al.

(10) Patent No.: US 7,869,450 B2
(45) Date of Patent: Jan. 11, 2011

(54) METHOD AND APPARATUS FOR PROCESSING LABELED FLOWS IN A COMMUNICATION ACCESS NETWORK

(75) Inventors: Nick DelRegno, Rowlett, TX (US); Scott R. Kotrla, Wylie, TX (US); David E. McDysan, Great Falls, VA (US); Michael U. Bencheck, Denison, TX (US); Matthew W. Turlington, Richardson, TX (US); Ross S. Hardin, Plano, TX (US); Richard C. Schell, Allen, TX (US); Howard Chiu, Plano, TX (US); Lee D. Bengston, Murphy, TX (US); William Drake, Garland, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1399 days.

(21) Appl. No.: 10/858,503

(22) Filed: Jun. 1, 2004
(Under 37 CFR 1.47)

(65) Prior Publication Data
US 2005/0220022 A1    Oct. 6, 2005

Related U.S. Application Data

(60) Provisional application No. 60/560,009, filed on Apr. 5, 2004.

(51) Int. Cl.
*H04L 12/56* (2006.01)
(52) U.S. Cl. .................................. 370/409; 370/467
(58) Field of Classification Search ............ 370/395.21, 370/235, 395.53, 395.3, 401, 229, 230, 230.1, 370/231, 411, 465, 466, 467, 474, 532–545, 370/409, 392, 395.5; 709/236–238
See application file for complete search history.

(56) References Cited

U.S. PATENT DOCUMENTS

| 5,412,647 | A  | 5/1995  | Giroux et al.    |
| 5,805,600 | A  | 9/1998  | Venters et al.   |
| 5,910,954 | A  | 6/1999  | Bronstein et al. |
| 5,987,034 | A  | 11/1999 | Simon et al.     |
| 6,205,488 | B1 | 3/2001  | Casey et al.     |

(Continued)

FOREIGN PATENT DOCUMENTS

EP    1065858    1/2001

(Continued)

OTHER PUBLICATIONS

Neogi et al., "Design and Performance of a Network-Processor-Based Intelligent DSLAM", IEEE Network, IEEE Inc., New York, US, vol. 17, No. 4, Jul. 2003, pp. 56-62.

(Continued)

*Primary Examiner*—Aung S Moe
*Assistant Examiner*—Habte Mered

(57) ABSTRACT

A system and method is provided for managing access communications between the service edge of a communications service provider and a customer. Access communications are carried in the form of carrier-tagged flows, the communications traffic being appended with carrier tags having significance to handling of the traffic through access network elements. A building aggregation system is provided which couples to customer premise equipment and interfaces customer flows to carrier-tagged flows used in the access network.

8 Claims, 9 Drawing Sheets

U.S. PATENT DOCUMENTS

| | | |
|---|---|---|
| 6,381,649 B1 | 4/2002 | Carlson |
| 6,499,061 B1 | 12/2002 | Benayoun et al. |
| 6,603,756 B1 | 8/2003 | Tappan |
| 6,634,297 B2 | 10/2003 | Poetter et al. |
| 6,643,297 B1 | 11/2003 | Sproat et al. |
| 6,731,649 B1 | 5/2004 | Silverman |
| 6,775,283 B1 | 8/2004 | Williams |
| 6,778,494 B1 | 8/2004 | Mauger |
| 6,870,812 B1 | 3/2005 | Kloth et al. |
| 6,934,250 B1 | 8/2005 | Kejriwal et al. |
| 6,944,168 B2 | 9/2005 | Paatela et al. |
| 6,977,932 B1* | 12/2005 | Hauck ................ 370/392 |
| 6,985,488 B2 | 1/2006 | Pan et al. |
| 7,031,312 B1 | 4/2006 | Jayakumar et al. |
| 7,031,607 B1 | 4/2006 | Aswood Smith |
| 7,068,654 B1 | 6/2006 | Joseph et al. |
| 7,092,389 B2* | 8/2006 | Chase et al. ............. 370/389 |
| 7,120,151 B1* | 10/2006 | Ginjpalli et al. .......... 370/395.1 |
| 7,126,907 B2 | 10/2006 | Carpini et al. |
| 7,130,261 B1 | 10/2006 | Skrzynski et al. |
| 7,164,692 B2 | 1/2007 | Cox et al. |
| 7,227,867 B1 | 6/2007 | Ferguson et al. |
| 7,330,481 B2 | 2/2008 | Jones et al. |
| 7,411,904 B2* | 8/2008 | Foote et al. ............. 370/230 |
| 7,463,639 B1* | 12/2008 | Rekhter ................ 370/409 |
| 7,480,306 B2 | 1/2009 | Unbehagen et al. |
| 2002/0075542 A1 | 6/2002 | Kumar et al. |
| 2002/0114274 A1 | 8/2002 | Sturges et al. |
| 2002/0131408 A1 | 9/2002 | Hsu |
| 2002/0146026 A1* | 10/2002 | Unitt et al. ............. 370/428 |
| 2002/0150100 A1 | 10/2002 | White et al. |
| 2002/0163935 A1 | 11/2002 | Paatela et al. |
| 2002/0167949 A1 | 11/2002 | Bremer et al. |
| 2002/0176139 A1* | 11/2002 | Slaughter et al. ........... 359/172 |
| 2003/0012184 A1 | 1/2003 | Walker, III et al. |
| 2003/0016672 A1 | 1/2003 | Rosen et al. |
| 2003/0021287 A1 | 1/2003 | Lee et al. |
| 2003/0043830 A1 | 3/2003 | Floyd et al. |
| 2003/0145246 A1 | 7/2003 | Suemura |
| 2003/0147352 A1 | 8/2003 | Ishibashi et al. |
| 2003/0147412 A1 | 8/2003 | Weyman et al. |
| 2003/0185201 A1 | 10/2003 | Dorgan |
| 2003/0231640 A1 | 12/2003 | Basso et al. |
| 2004/0028051 A1 | 2/2004 | Etemadi et al. |
| 2004/0028064 A1* | 2/2004 | Cetin et al. ............ 370/409 |
| 2004/0042480 A1 | 3/2004 | Sproat et al. |
| 2004/0044789 A1 | 3/2004 | Angel et al. |
| 2004/0066780 A1 | 4/2004 | Shankar et al. |
| 2004/0076166 A1 | 4/2004 | Patenaude |
| 2004/0081172 A1 | 4/2004 | Ould-Brahim |
| 2004/0088430 A1 | 5/2004 | Busi et al. |
| 2004/0090967 A1* | 5/2004 | Doidge et al. .......... 370/395.53 |
| 2004/0153570 A1 | 8/2004 | Shobatake |
| 2004/0156313 A1* | 8/2004 | Hofmeister et al. ......... 370/229 |
| 2004/0158626 A1 | 8/2004 | Douglas |
| 2004/0162919 A1 | 8/2004 | Williamson et al. |
| 2004/0165600 A1 | 8/2004 | Lee |
| 2004/0170160 A1 | 9/2004 | Li et al. |
| 2004/0170167 A1 | 9/2004 | Cohen |
| 2004/0170173 A1* | 9/2004 | Pan et al. ................ 370/392 |
| 2004/0174882 A1 | 9/2004 | Willis |
| 2004/0179555 A1 | 9/2004 | Smith |
| 2004/0190548 A1 | 9/2004 | Harel et al. |
| 2004/0202148 A1 | 10/2004 | Kuehnel |
| 2004/0208198 A1 | 10/2004 | Christie et al. |
| 2004/0213232 A1 | 10/2004 | Regan |
| 2004/0221051 A1 | 11/2004 | Liong et al. |
| 2004/0252717 A1 | 12/2004 | Solomon et al. |
| 2004/0255028 A1* | 12/2004 | Chu et al. ................ 709/227 |
| 2005/0002333 A1 | 1/2005 | Aalders et al. |
| 2005/0044262 A1 | 2/2005 | Luo |
| 2005/0047341 A1 | 3/2005 | Kim et al. |
| 2005/0141504 A1* | 6/2005 | Rembert et al. ............ 370/392 |
| 2005/0147104 A1 | 7/2005 | Ould-Brahim |
| 2005/0160180 A1* | 7/2005 | Rabje et al. .................. 709/238 |
| 2005/0190757 A1 | 9/2005 | Sajassi |
| 2006/0002419 A1 | 1/2006 | Cox et al. |
| 2006/0018313 A1 | 1/2006 | Oki et al. |
| 2006/0159019 A1 | 7/2006 | Buskirk et al. |
| 2006/0209840 A1 | 9/2006 | Paatela et al. |
| 2007/0274321 A1* | 11/2007 | Jonsson et al. ......... 370/395.53 |
| 2007/0286198 A1* | 12/2007 | Muirhead et al. ........... 370/392 |
| 2009/0080431 A1* | 3/2009 | Rekhter ..................... 370/392 |

FOREIGN PATENT DOCUMENTS

| | | |
|---|---|---|
| WO | 00/46961 | 8/2000 |
| WO | 01/67804 | 9/2001 |
| WO | 02/15475 | 2/2002 |
| WO | 03/005648 | 1/2003 |
| WO | WO 03/077146 | 9/2003 |
| WO | WO 2004/025904 | 3/2004 |

OTHER PUBLICATIONS

Stein, "Pseudowire Customer Edge to Customer Edge Emulation", Pseudo-Wire Edge-to-Edge Working Group, PWE3 Internet Draft, Oct. 20, 2003.

"IEEE Standards for Local and Metropolitan Area Networks: Virtual Bridged Local Area Networks", IEEE Computer Society, Copyright 1999, IEEE Std. 802.1Q-1998.

Pretty et al., "Frame Relay Interworking with Asynchronous Transfer Mode", Global Telecommunications Conference, 1993, IEEE Houston, TX, US, Nov. 29-Dec. 2, 1993, pp. 1854-1860.

Walton, "Frame Relay to ATM Interworking" BT Technology Journal, BT Laboratories, GB, vol. 16 No. 1, Jan. 1998, pp. 96-105.

Williams, Mark, "Optical Ethernet Architecture Evolution: The Logical Provider Edge," Metro Ethernet Forum (Aug. 28, 2003) pp. 1-35.

Lang, Tao, "Making the Fiber Connection," Fiberoptic Product News, vol. 19, No. 2, Reed Electronic Group, New Jersey (Feb. 2004) 2 pages.

Zelig, et al., "Pseudo Wire (PW) Management Information Base," [on-line] [Last visited on: Jan. 26, 2004] http://www.ietf.org/internet-drafts/draft-ietf-pwe3-pw-mib-03, pp. 1-42.

Shah, et al., "Qos Signaling for PW," [on-line] [Last visited on: May 27, 2004] http://www.ietf.org/internet-drafts/draft-shah-pwe3-pw-qos-signaling-00, pp. 1-7.

Bryant, et al., "PWE3 Architecture," [on-line] [Last visited on: May 27, 2004] http://www.ietf.org/internet-drafts/draft-ietf-pwe3-arch-06, pp. 1-34.

Xiao, et al., "Requirements for Pseudo-Wire Emulation Edge-to-Edge (PWE3)," [on-line] [Last visited on: Jan. 17, 2004] http://www.ietf.org/internet-drafts/draft-oetf-pwe3-requirements-08,. pp. 1-20.

Martini, et al., "Pseudowire Setup And Maintenance Using LDP," [on-line] [Last visited on: Jun. 1, 2004] http://www.ietf.org/internet-drafts/draft-ietf-pwe3-control-protocol-06, pp. 1-31.

Zelig, et al., "Ethernet Pseudo Wire (PW) Management Information Base," [on-line] [Last visited on: Jan. 26, 2004] http://www.ietf.org/internet-drafts/draft-ietf-pwe3-enet-mib-03, pp. 1-21.

Zelig, et al., "Pseudo Wire (PW) Over MPLS PSN Management Information Base," [on-line] [Last visited on: Feb. 3, 2004] http://www.ietf.org/internet-drafts/draft-ietf-pwe3-pw-mpls-mib-04, pp. 1-25.

Nadeau, et al., "Pseudo Wire (PW) Virtual Connection Verification," [on-line] [Last visited on: May 27, 2004] http://www.ietf.org/internet-drafts/draft-oetf-pwe3-vccv-02, pp. 1-16.

Bonica, et al., "ICMP Extensions for Multiprotocal Label Switching," [on-line] [Last visted on: May 27, 2004] http://www.ietf.org/internet-drafts/draft-bonica-icmp-mpls-02, pp. 1-10.

Pepelnjak, et al., "MPLS and VPN Architectures," May 23, 2002 Cisco Press chapter 9, pp. 1-4.

* cited by examiner

METHOD AND APPARATUS FOR PROCESSING LABELED FLOWS IN A COMMUNICATION ACCESS NETWORK

PRIORITY CLAIM AND CROSS-REFERENCE TO RELATED APPLICATIONS

The present application claims priority to U.S. Provisional Patent Application Ser. No. 60/560,009, filed Apr. 5, 2004, entitled "System and Method for Using Labeled Flows in a Communications Access Network," assigned to the assignee of the present application and incorporated herein by reference its entirety.

The present application is also related to the following co-pending applications, which are assigned to the assignee of the present application and incorporated herein by reference in their entireties:

U.S. patent application Ser. No. 10/858,502, filed concurrently herewith and entitled "System and Method for a Communications Access Network;"

U.S. patent application Ser. No. 10/858,501, filed concurrently herewith and entitled "System and Method for Controlling Communication Flow Rates;"

U.S. patent application Ser. No. 10/858,491, filed concurrently herewith and entitled "Apparatus and Method for Terminating Service Emulation Instances;"

U.S. patent application Ser. No. 10/858,517, filed concurrently herewith and entitled "System And Method For Providing A Multiple-Protocol Crossconnect;" and U.S. patent application Ser. No. 10/858,525, filed concurrently herewith and entitled "System And Method For Managing Communications In An Access Network."

TECHNICAL FIELD

The present invention relates generally to a system and method for providing telecommunication services to customers, and more particularly, to a system and method for providing access services between a customer's site and a service edge.

BACKGROUND

A commercial telecommunications network operated by a service provider supports voice and data communications between customer locations and includes an access network and a core network. Generally, customer devices communicatively couple to the access network, which in turn connects to the core network. The access network includes what many people refer to as "the last mile," that is, the connectivity from a customer location, such as an office building, to a point where a service provider has significant facilities, such as a metro hub or a "service edge" at the periphery of the core network. In contrast to the access network, the core network usually provides transport of large aggregate flows over long distances and handles the selective routing of each customer's voice and data traffic to other locations served by the network. The access network generally comprises a series of switches, aggregators, multiplexers, demultiplexers, routers, hubs, and the like which collectively serve to provide connectivity between customers' equipment and the core network.

Customer sites in the vicinity of a service provider's edge, or an intermediate hub that provides connection to the service edge, must be connected to the service edge via some form of access circuit. Traditionally, it has been more practical for a core network service provider to operate a few strategically placed facilities to serve a large number of customers in a metropolitan area rather than to extend the service provider's core network to every physical location where customers may reside. Providing access services between a customer's location and a metro hub or a service edge may involve installing electrical or optical cables between the service provider and the customer site. In some cases, the service provider installs and owns this access link connected directly to the customer location. More often, however, the existing facilities of a local telephone carrier are leased to provide this connectivity. The well-established local telephone facilities provide at least twisted-pair subscriber loop connectivity to virtually every potential customer location in a metropolitan area. In the case of larger business locations and multi-tenant commercial sites, local telephone facilities typically comprise a large quantity of telephone wires or broadband access to the sites.

The services required by customers, residential or business, vary greatly in the type of access services, bandwidth, quality of service (QoS), type of legacy equipment, and the like. Types of services typically include frame relay services, asynchronous transfer mode (ATM) services, broadband services, point-to-point private line services, voice services, and the like. Accordingly, the access service provider must be prepared to provide many types of services to customers of various sizes and needs.

Furthermore, the access service provider must be capable of meeting the customers current and future needs in terms of bandwidth, QoS, and the like. For example, a given customer may start with relatively small bandwidth needs yet expand to needing high-bandwidth connections such as a SONET OC-3 or OC-12 connection. Additionally, customers may require ATM services and frame relay services to support legacy systems while implementing newer applications and communications that are based on Ethernet.

Typically, the access service provider provisions and handles each of these services separately and does not attempt to aggregate the traffic from various types of services. Treating the traffic separately in this manner, however, can be expensive. Typically, the access network provides transport, aggregation, grooming, and switching for each of these types of services independently, which in turn requires the access service provider to provision each of these services separately. Generally, each type of service utilizes different interface and framing standards, and in particular, each type of service typically utilizes a different set of protocols. As a result, current access network elements must be equipped to interface with and operate upon flows for each type of service the elements are expected to handle. Each network element in an access network presently must deal with the particular format, addressing and protocol aspects of each type of access communication service it supports. This makes for costly and complex network elements and interferes with having flexibility to accommodate rapid shifts in resources allocated to different flows or different service types and to accommodate adoption of new service types.

SUMMARY OF THE INVENTION

An access service provider desires a method and a system to provide services to customers in a cost effective manner. The services should be provided in a manner to allow the access service provider to provide various types of services to one or more customers. Furthermore, the method and system should allow for the easy aggregation of traffic of many types to allow the communications links to serve more customers and allow for the rapid deployment and provisioning of new services.

The aforementioned problems are generally solved or circumvented, and technical advantages are generally achieved, by preferred embodiments of the present invention that provide an aggregation system for use in a telecommunications network.

In accordance with a preferred embodiment of the present invention, a method and an apparatus for transmitting traffic to and from customer premise equipment via a service emulation instance, such as a pseudo-wire, a virtual local-area network, and the like is provided. Traffic is received via a first flow, and a first service emulation instance is associated with the first flow. A first service emulation mapping identifier, representing the first service emulation instance, is appended to the first flow. The traffic is then transmitted via the service emulation instance.

In accordance with another embodiment of the present invention, the first flow is received from customer premise equipment and the traffic is transmitted to a service edge via the service emulation instance.

In accordance with yet another embodiment of the present invention, a method and an apparatus for sending traffic to customer premise equipment is provided. Traffic is received via a first traffic flow from a service edge, wherein the traffic flow includes a flow id. The flow id is optionally removed from the traffic and the traffic is transmitted to the customer premise equipment.

Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed herein are merely illustrative of specific ways to make and use the invention, and do not limit the scope of the invention.

The present invention will be described with respect to preferred embodiments in a specific context, namely, providing aggregation services to one or more customers in an office building communicatively coupled to a telecommunications network via a TDM communications link, for example a DS3. The invention may also be applied, however, to other types of devices, networks, communications links, and the like. Furthermore, while specific network configurations are illustrated and discussed herein, it is noted that network configurations may vary to include fewer or additional elements, such as routers, gateways, bridges, ATM switches, frame relay switches, firewalls, and the like. The illustrated embodiments are provided for illustrative purposes only and are provided only to aid in the explanation and understanding of the concepts of the present invention. Aspects of the present invention are equally applicable to many types and configurations of networks and communications protocols.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless otherwise indicated.

Figure 1:
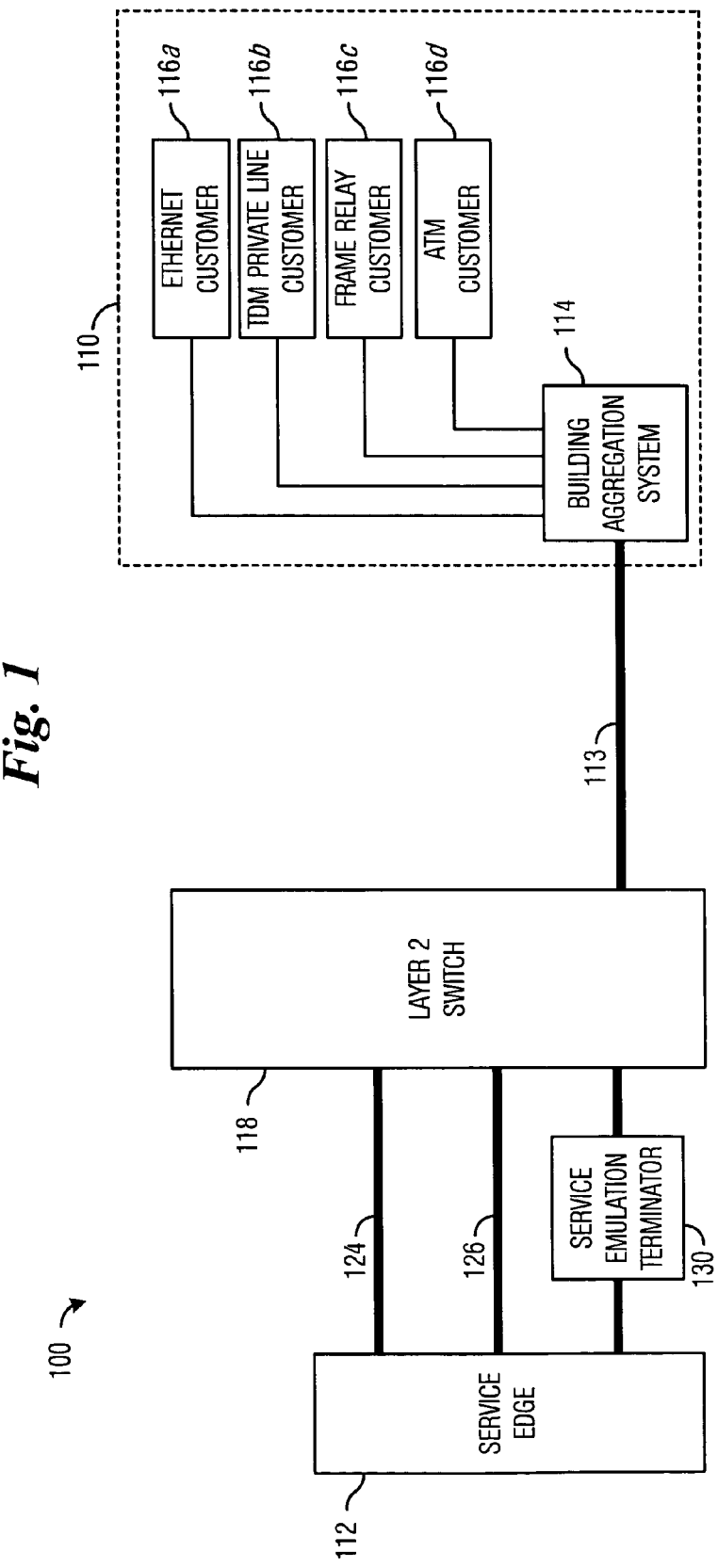
FIG. 1 is a network diagram of an access network embodying features of the present invention.

FIG. 1 is a network diagram in accordance with an embodiment of the present invention. FIG. 1 illustrates an access network 100 by which a customer site 110 is coupled to, and accesses the services of, a service edge 112. Customer site 110 may be, for example, an office building housing a large number of users, such as employees of one or more business enterprises. The users or businesses may subscribe to the services of a service provider whose point of presence is service edge 112.

Generally, the service edge 112 represents the access point(s) to the service provider's network, which may comprise one or more core networks (not shown). A core network may comprise, for example, a system of TDM switches, such as a network of Class 3 telephone switches. A core network may also comprise an ATM and/or a frame relay network covering much the same geographical territory as the TDM network. Moreover, a network of IP routers may also be supported in a core network. While each of these networks may overlap or cover much the same geographical territory, each are designed to efficiently carry particular types of traffic or exhibit particular properties that are amenable to certain types of traffic. Although this "multiplanar" network situation may frequently be encountered, it should be understood that the present invention may be equally applicable to a converged core network where native layer 2 handoff at the service edge is preferred. Service edge 112 is illustrated as a single network element for illustrative purposes only, and may actually include multiple network elements or multiple access interfaces having different capabilities.

By way of example, sources of different types of communications are depicted within customer site 110. One of the sources is Ethernet customer 116a coupled to a building aggregation system 114 over any form of connectivity amenable to Ethernet traffic, such as a 100BaseT, Gigabit Ethernet(GbE) or DSL connection. Another source of traffic may be private line customer 116b, which is coupled to the building aggregation system 114 via DS1 line. Source 116c represents frame relay customers having their frame relay traffic carried over TDM facilities such as DS1 lines to the building aggregation system 114. Asynchronous transfer mode (ATM) customer 116d represents ATM customers having their ATM cell traffic carried over TDM facilities such as DS1 lines to the building aggregation system 114. Other types of connections may be used as required to support specific customers' needs. Each of the CPE 116 may comprise one or more devices. For example, the Ethernet customer 116a typically includes a router communicatively coupled to other routers, hubs, user workstations, servers, or the like. The CPE 116a-116d are collectively referred to as CPE 116.

As noted above, customers within a building may require different types of access, or a single customer may require different types of access for different services. As will be discussed in greater detail below, the building aggregation system 114 preferably provides an interface to one or more pieces of CPE, which may be using one or more communications protocols, and aggregates the traffic for transmission to the service edge 112. In this manner, economies of scale may be realized by combining traffic from a plurality of less than fully utilized communications channels. A building aggregation system may serve multiple buildings within a reasonable proximity, such as a corporate, institutional campus or any other collection of sites where it is feasible.

Other components, such as demarcation devices, repeaters, amplifiers, and the like, may be communicatively coupled between the building aggregation system 114 and each CPE 116a-116d. A demarcation device, commonly used when providing Ethernet services (such as that provided to an Ethernet customer, represented by CPE 116a), is the point at which the customer connects to the resources of the access network 100. Additional repeaters (not shown) or amplifiers (not shown) may be required based upon, for example, the length of the wire runs.

On the network side, the building aggregation system 114 is preferably communicatively coupled to one or more hubs or switches, represented by switch 118, to provide connectivity between the customer location 110 and the service edge 112. The communications link 113 between the building aggregation system 114 and the switch 118 may, for example, be a TDM communications link, such as a DS3 or SONET OC-n. In accordance with a preferred embodiment, these TDM links utilize a protocol such as X.86, GFP, PPP, or the like for accomplishing packet data transport over TDM. The communications path between the customer location 110 and the service edge 112 is illustrated as a simple two-hop connection for illustrative purposes only. The communications path between the customer location 110 and the service edge 112 may contain additional or fewer hops, and may include different paths for traffic in either direction between a service edge and a customer site. Customer location 110, through building aggregation system 114, may be coupled to service edge 112 through a network of switches and other equipment and facilities.

Additional network elements may be positioned between the building aggregation system 114 and the switch 118. For example, the building aggregation system 114 may be configured to accept a DS3 communications link as discussed above, but the communications link from the access network to the building 110 may comprise a larger communications link, such as an OC12 or OC48 optical link. In this situation, which is common in an "on-network" environment wherein the access network is owned by the service provider, an add/drop multiplexer (ADM) may be utilized to separate the DS3 traffic from and interject the DS3 traffic onto the larger OC12 or OC48 link. In an "off-network" environment, a smaller DS3 link may be leased directly from another party, such as a local telephone company or other service provider.

In accordance with a preferred embodiment, layer 2 switch 118 may provide switching and routing of traffic based upon information applied to the traffic and without having to examine the content of the customer data in the traffic. The information applied to the traffic may correspond roughly to Layer 2 or the "data link layer" of the OSI Reference Model. Layer 2 switch 118 may be coupled to a large number of customer sites 110 and building aggregation systems 114 to perform an intermediate aggregation and distribution function within the access network 100. In some instances, the layer 2 switch 118 may also be coupled directly to some or all of CPE 116.

An example of a layer 2 switch 118 suitable for use with the present invention is disclosed in U.S. patent application Ser. No. 10/858,517, and entitled "System And Method For Providing A Multiple-Protocol Crosseonnect", which is incorporated herein by reference.

The building aggregation system 114 may apply information to the traffic that has significance for affecting the handling of carrier-tagged communications within the access network and may be interpreted and acted upon by layer 2 switch 118 or other elements. Building aggregation system 114 may also receive communications bearing this information and may route the communications to specific customers in response to the information.

In accordance with the present teachings, the building aggregation system 114 can be equipped to serve as one end of a plurality of carrier-tagged flows. A carrier-tagged flow represents a logical communications channel or flow established to carry carrier-tagged communications between two or more parties, or two or more points served by a communications system. The carrier-tagged communications can be voice, data, audio, video, or any other type of communications.

A carrier-tagged flow may be implemented using a service emulation instance, such as a pseudowire as described in an IETF draft document entitled "draft-ietf-pwe3-arch-06.txt." This technology allows a packet-switched network to emulate other types of packet or TDM transport services. For example, a pseudowire may be implemented in an Ethernet network, yet may provide transport of communications that mimics the attributes and performance of common data link protocols, such as ATM, frame relay, as well as SONET/SDH or DSn signals. An Ethernet-based pseudowire may employ variable length packets even when carrying fixed-length cells or frames, such as 53-byte ATM cells.

A pseudowire is typically implemented along a tunnel implemented in a packet-switched network. Some types of tunnels that may be suitable for carrying pseudowires, or other types of communications that may be employed in conjunction with the present teachings, include Label Switched Paths(LSPs) according to the MultiProtocol Label Switching(MPLS) protocol, Layer 2 Tunneling Protocol (L2TP) tunnels, IPsec tunnels, etc.

Another example of a technique suitable for implementing a carrier-tagged flow is a logical networking tagged flow, such as virtual local-area network (VLAN) communications or the like. A technique for achieving VLAN logical subnetworking is described in EEE Standard 802.1Q. Briefly, a VLAN provides for designating and acting upon data packets in a manner that makes multiple LAN communication flows carried over a commonly shared communication path appear to be partitioned from one another as if traveling over separate, dedicated LAN connections. In accordance with an exemplary embodiment of the present teachings, a VLAN tagging approach may also be used for carrier-tagging of flows.

In accordance with the present teachings, carrier VLAN tags having significance for routing and processing in the access network are used to encapsulate and tag customer flows. AS they are encapsualted and/or tagged, customer flows may or may not already contain additional imbedded VLAN tags having significance within the customer's virtual network in accordance with typical 802.1Q usage. In accordance with the present teachings, the VLAN tagging approach may be reused for carrier-tagging purposes and may be locally significant on any port, with tag values possibly being replaced on a hop-by-hop basis.

In accordance with the present teachings, carrier tags which are applied to traffic to support handling of flows through an access network, whether in the form of tunnel labels, pseudowire labels, VLAN tags, etc., may be 'stackable' to any depth to support efficient flow management in the context of hierarchical aggregation and distribution between service edge(s) and customer locations.

In addition to supporting access communications that enable carrier tag stacking, a building aggregation system in accordance with the present teachings may serve several roles in the context of a service-agnostic access network. The building aggregation system may adapt a wide variety of customer traffic to be carried in the form of carrier-tagged flows. Where a packet switched network is used as an underlying access transport, the use of carrier-tag switching enables the efficiencies and flexibility of packetization to be realized in an access network without burdening the access network elements with the specific protocols or addressing used in the carried traffic.

To coordinate the assigning of carrier tags to traffic flows, the building aggregation system may participate in label resolution protocols with other elements and may receive provisioning instructions from remote management systems. To support the deployment of service emulation, such as pseudowire technology, in an access network to achieve service flexibility, the building aggregation system may serve as a terminal end for a large number of service emulation instances of different emulated types and may provide mapping and forwarding between customer flows and access network paths as identified by tunnel labels or service emulation instance mapping identifiers. The building aggregation system may also implement QoS functions for all types of flows, augmenting similar measures that may be performed at a service edge. Other possible roles and functions of the building aggregation system will be described below.

Building aggregation system 114 is preferably used in a carrier-tag oriented access network wherein each carrier-tagged flow is identified by a carrier tag having a particular tag value. For example, a carrier-tagged flow implemented as a service emulation instance is identified by a service emulation instance mapping identifier. In the case in which a pseudowire is used as a service emulation instance, the service emulation instance mapping identifier may take the form of a pseudowire label. Carrier tags may be locally significant on any port and the tags can be swapped on a hop-by-hop basis as needed to provide a large number of flows using the finite number of identifier values that are available (approximately 1 million in the case of pseudowire labels). In this manner, switching in the access network can be simplified by encapsulating traffic in carrier-tagged flows and by interpreting and manipulating the corresponding carrier tags.

An access network in accordance with the present teachings may transparently support a mixture of flow types and customer content, including any customer-specific addressing or virtual networking fields imbedded in the customer content. The pseudowire architecture, as described in documents promulgated by the Internet Engineering Task Force (IETF), provides one example of an approach involving encapsulation and labeling of traffic that may be adapted for use as a carrier-tagged flow. It should be noted, however, that other protocols may be used, and embodiments of the present invention may be implemented with other types of protocols and physical connections.

The building aggregation system 114 couples traffic of various types, such as traffic from the CPE 116a-116d, onto the appropriate corresponding carrier-tagged flows established for reaching the service edge. Where service emulation instances are used as carrier-tagged flows, a service emulation instance terminator 130 may serve as the other end of a number of service emulation instances which have originated at one ore more building aggregation systems 114 and passed through layer 2 switches 118. The service emulation instance terminator 130 switches or routes traffic from service emulation instances to a corresponding port and/or flow communicatively coupled to the service edge 112. The building aggregation system 114, layer 2 switch 118, service emulation instance terminator 130, and communications links therebetween may coordinate to simultaneously function as any of the various data-link layer transport types that may be required by customers, including ATM, frame relay, TDM, Ethernet/IP, and the like.

Alternatively, a service edge 112 may incorporate the functions of a service emulation instance terminator 130 or may otherwise be capable of directly accepting and processing carrier-tagged flows. In this case, a service edge 112 may be coupled more or less directly to layer 2 switch 118 and the communications to and from the service edge may bear flow-identifying carrier tags in the form of pseudowire labels, tunnel labels, VLAN tags or the like. Service emulation instance terminator 130 may nevertheless be useful in situations where an existing or legacy service edge facility lacks the ability to handle carrier-tagged access communications, service emulation instances or, more specifically, pseudowires. As mentioned earlier, service edge 112 may actually represent several separate access points, perhaps to different types of core networks. Some access points within service edge 112 may be amenable to carrier-tagged flows whereas others may not be. Links 124 and 126 may represent links to TDM-capable ports on the service edge from TDM ports on layer 2 switch 118. It is also possible that, for example, one or both of these links may represent packetized data links or may represent a service edge that is able to accept carrier-tagged flows, such as carrier-tagged pseudowires, directly without requiring service emulation instance terminator 130.

A service emulation instance terminator 130 suitable for use with the present invention is disclosed in U.S. patent application Ser. No. 10/858,491, entitled "Apparatus and Method for Terminating Service Emulation Instances", which is incorporated herein by reference.

In an exemplary embodiment, Ethernet may be utilized as the layer 2 protocol over which carrier-tagged communications are transmitted. The application of Ethernet in the access network can be based on TDM encapsulation, using X.86 or GFP, e.g. Ethernet over SONET (EoS). While Ethernet is desirable because it supports variable length packets or frames, other protocols or frame formats may be used for the transport and processing of access communications.

In an implementation using service emulation instances, building aggregation system 114 may apply a unique service emulation instance mapping identifier to each of the flows from the CPE 116a-116d, and transmits the frames or packets bearing the traffic and service emulation instance mapping identifiers to the layer 2 switch 118. Similarly, the building aggregation system 114 may receive data associated with a service emulation instance identifier from the layer 2 switch 118 and converts the data to a format compatible with the corresponding CPE 116.

As another example, the building aggregation system 114 may receive Ethernet traffic from Ethernet customer 116a via the building "riser." The building aggregation system 114 receives this traffic along a port that is known to correspond to Ethernet customer 116a and maintains an association between the customer's port and Ethernet traffic stream and a corresponding carrier-tagged flow. Likewise, at the other end of the carrier-tagged flow, the service emulation instance terminator 130, the layer 2 switch, or some other network element delivers the customer's traffic to the service edge 112 and may coordinate with the service edge 112, such as by mapping of port numbers or directing of flows, to ensure that the network identifies the customer's traffic as such and appropriately handles the traffic.

In accordance with a preferred embodiment of the present invention, when a device on a customer LAN addresses Ethernet frames to the service edge, the destination MAC address field in the Ethernet frames will correspond to that of the service edge itself or some other remote device port rather than being associated with any of the access network elements. CPE may be provisioned to resolve the address of the service edge such that communications intended to be sent to the service edge will arrive at a port of the building aggregation system. The building aggregation system does not need to act as a layer 2 termination point as it appears to the CPE, so no MAC learning behavior or other typical LAN bridge behavior is required of the building aggregation system.

To establish or modify a customer's carrier-tagged flow between the CPE 116 and the service edge 112, the customer may indicate to the network service provider the desire to establish communications in a particular manner. This request may be submitted either manually or automatically through a user network interface (UNI). As will be described in greater detail below, the establishment of communications through the access network shown may originate in a variety of ways. To coordinate fulfillment of an access communications request, a network management system, provisioning function, or the like, may dispatch provisioning and configuration instructions to the building aggregation system 114, the layer 2 switch 118, the service emulation instance terminator 130, or other network elements. To varying degrees, these elements may perform some functions autonomously or may coordinate with one another to fulfill service requests.

For convenience, the operation of exemplary embodiments of the present invention discussed herein are often described in terms of traffic flowing from the CPE 116 to the service edge 112. However, it should be noted that the same techniques discussed herein also apply to traffic leaving the service edge and being distributed to an appropriate customer endpoint. Every element may serve a complementary role related to the direction of flow. It is also worth mentioning that some traffic through an access network may be from one customer location to another in a given vicinity and may not necessarily be destined for a service edge. Many of the techniques described for traffic between a customer location and a service edge would be applicable to this situation as well.

Figure 2:
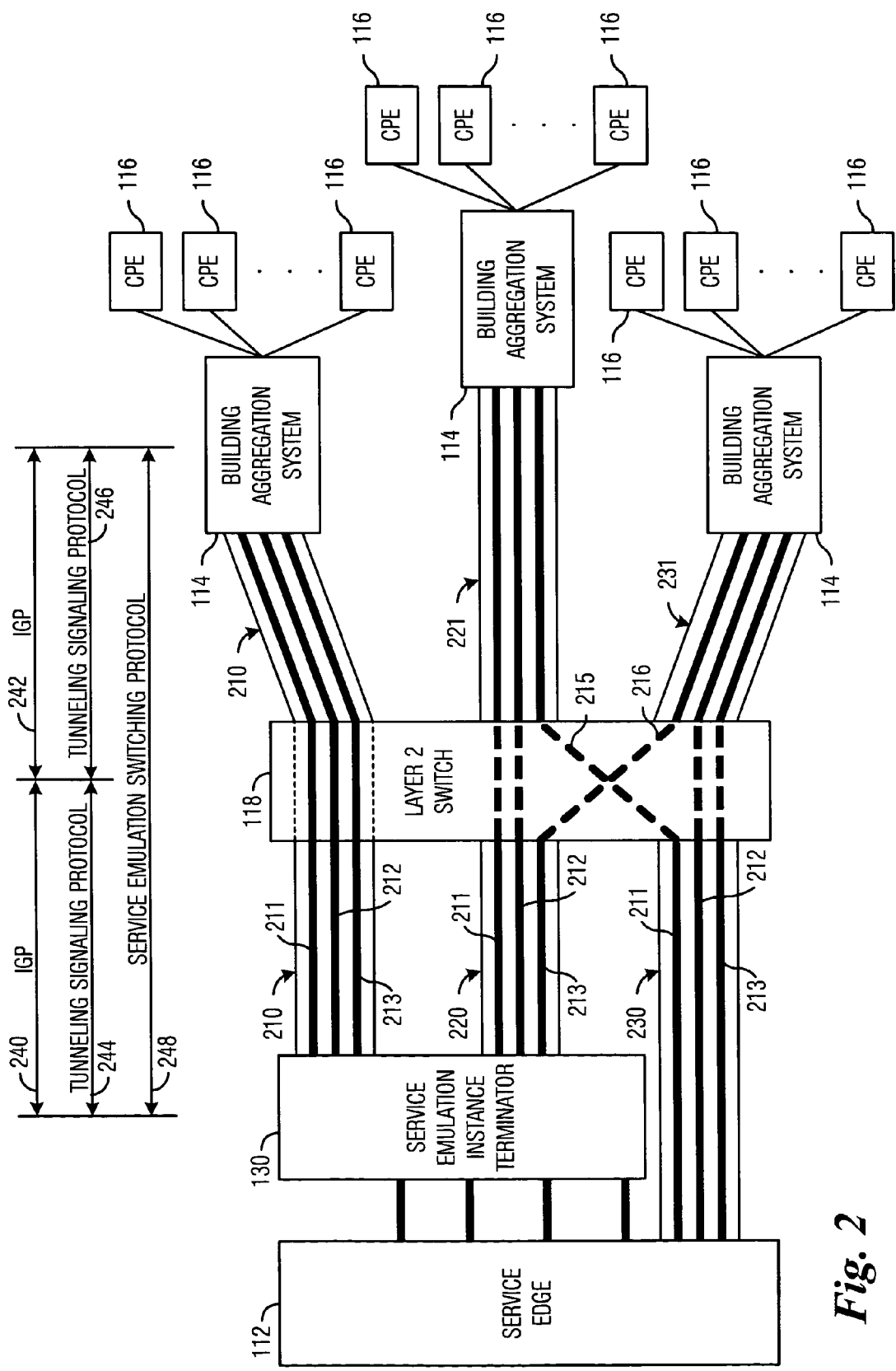
FIG. 2 is logical view of the use of service emulation instances in the access network in accordance with one embodiment of the present invention.

FIG. 2 is a logical view of example carrier-tagged flows through an access network in accordance with an embodiment of the present invention. Customer sites (represented by CPE 116 coupled through building aggregation systems 114) are shown to be coupled, through various access network resources, to the edge of a service provider's network represented by the service edge 112, and optionally involving service emulation instance terminator 130. The layer 2 switch 118 is shown as an intermediary and may participate in grooming, aggregating and directing communications traffic in the access network, as well as performing crossover switching between TDM ports and packet-oriented ports. For clarity, FIG. 2 illustrates two-hop paths, although it is possible that there are some intervening transmission elements or other layer 2 switches 118 along the access coupling.

In FIG. 2, tunnels in the form of label switched paths (LSPs) 210, 220, 221, 230, and 231 are shown to have been established between various building aggregation systems 114 and the service edge 112 (optionally through terminator 130). Each LSP corresponds to a pathway or a tunnel for carrying traffic from the building aggregation system 114 to the service edge 112, or vice versa. It should be noted that FIG. 2 is provided as a logical view and that various physical implementations may be used. For example, each of the label switched paths 210, 220, 221, 230 and 231 may be transported, routed or switched over different physical links or the same physical link.

Each LSP is shown to be carrying a respective set of carrier-tagged flows 211, 212, and 213. In some implementations, such as when service emulation instances are used, each carrier-tagged flow may emulate a specific type of service, such as an ATM, frame relay, ethernet or TDM/SONET service. Regardless of emulated service type, the traffic belonging to these carrier-tagged flows is made to travel along an LSP or tunnel based upon a carrier tag applied to the traffic and a mutual understanding among the network elements as to how to handle traffic having a specific tag value.

Where service emulation instances are used to implement carrier-tagged paths, the traffic may be identified and routed through the access network based on a service emulation instance mapping identifier which serves as the carrier tag (or as one part of a composite carrier tag.) More specifically, where pseudowires are used as service emulation instances, a pseudowire label in each traffic packet or frame may serve as a carrier tag component.

In an implementation wherein logical networking tagged flows are used, an outer VLAN tag may serve as the carrier tag, or a portion thereof. A tunnel label, such as an LSP label, may also be applied to the traffic and may be used, solely or in conjunction with other fields, as the label upon which the traffic is routed through access network elements. In accordance with a preferred embodiment, any of these possible carrier tags may be present multiple times or may be stacked in any combination with one another within the traffic packets or frames. This may be done to support various flow management arrangements that involve nesting of tunnels or flows or otherwise implementing stages of aggregation in the access network.

Examples of how nested tunnels or paths may be accomplished and managed are disclosed in U.S. patent application Ser. No. 10/858,525, entitled System And Method For Managing Communications In An Access Network, which is incorporated by reference herein.

Each carrier-tagged flow 211, 212, 213 may carry multiple customer-specified "subflows" in a manner that is transparent to the access network. That is, the customer traffic may optionally contain additional imbedded VLAN tags having significance within the customer's virtual private network in accordance with typical 802.1Q usage. Any VLAN tags or layer 2 VPN addressing fields that are present within the customer traffic may be encapsulated using carrier VLAN tags having significance for routing and processing in the access network. Consequently, a traffic frame or packet in accordance with the present teachings may comprise some VLAN tag fields that are controlled by a customer, or have significance within the customer's private network, in addition to VLAN tags that serve as carrier tags having significance to the access network. Compared to any customer-imposed VLAN tags appearing in the traffic, the carrier VLAN tags may be derived from the operation of entirely different protocols among different elements than the customer tags. Likewise, where other forms of carrier tags are employed, such as pseudowire labels, the carrier tags may resemble customer labels or tags appearing in customer traffic, but will have different significance and may be derived from different protocols than the customer information. In accordance with the present teachings, the access network may be primarily concerned with the outermost labels or carrier tags that have been applied to the traffic for access network purposes, such as tunnel labels or service emulation instance mapping identifiers applied to the traffic. In accordance with the present teachings, a VLAN tag format may be applied for carrier-tagging purposes and may be locally significant on any port, with tag values possibly being replaced on a hop-by-hop basis.

Label switched path 210 represents an exemplary embodiment in which the carrier-tagged flows are routed through layer 2 switch 118 on the basis of a tunnel label. In other words, each unit of traffic is tagged with a tunnel label and access network elements use the tunnel label to determine how to process and where to send the traffic. In this situation, a tunnel may be established from building aggregation system 114 straight through to service emulation instance terminator 130. Each flow within the tunnel identified by the tunnel label, e.g., label switched path 210, is routed or switched in the same manner, as illustrated by the dotted label switched path line and the solid-lined flows passing through the layer 2 switch 118. With this approach, layer 2 switch 118 may efficiently switch traffic among its ports by observing and acting solely or primarily upon this tunnel label present in the traffic. Layer 2 switch 118 may not have to read and act upon a service emulation identifier, such as a pseudowire label, in order to properly route traffic of this nature.

In an alternative embodiment, the carrier-tagged flows 211, 212, 213 may be service emulation instances and each service emulation instance may be routed or switched based upon a service emulation instance mapping identifier. For example, the label switched paths 221 and 231 are shown to be established between the various building aggregation systems 114 and layer 2 switch 118. Other LSPs 220 and 230 are separately established between the layer 2 switch 118 and the service edge 112. This provides the option of switching individual flows within layer 2 switch 118. Switching within layer 2 switch 118 may be based upon a service emulation instance mapping identifier present in the traffic.

As in this example, where tunnels directly connect network elements without passing through other switching or terminating elements, tunnel labels may be optional due to the point-to-point nature of the communication. Nevertheless, a tunnel label field may be included to convey useful information, possibly aside from tunnel identification.

To illustrate flow switching within layer 2 switch 118, certain of the flows 211, 212, and 213 are illustrated as remaining together within each of the labeled switched paths. Upon reaching a switching point, such as layer 2 switch 118, at the terminus of a tunnel, such as label switched path (LSP) 221, each flow through the access network may be switched independently based upon, among other things, the type of service being provided, the requested service edge, one or more aspects of the traffic, and the like. As indicated by the dotted lines 215 and 216, each of the carrier-tagged flows within label switched paths 220, 221, 230, and 231 may be routed or switched independently of each other as they pass through layer 2 switch 118, the identification and switching of each flow being based upon a flow identifier such as a pseudowire label. In contrast, the flows within LSP 210 are not switched at layer 2 switch 118 because the tunnel extends between building aggregation system 114 and service emulation instance 130 and, consequently, layer 2 switch 118 only observes and acts upon the tunnel label. Usually, a tunnel such as LSP 210 would have been established to expressly avoid switching of individual flows through layer 2 switch 118. In practice, either approach, i.e. "tunneling to" or "tunneling through" layer 2 switch 118, may be desirable under various circumstances.

As depicted by reference numeral 248, a label selection or service emulation switching protocol, such as the Label Distribution Protocol (LDP), may be exercised among the endpoints of a tunnel, a carrier-tagged path, a service emulation instance, a pseudowire, or the like in order to assure agreement among network elements on how traffic will be identified within the tunnel or path. In many cases, these endpoints may be the building aggregation system 114 and the service edge 112 or service emulation instance terminator 130.

Reference numerals 240 and 242 represent how routes are chosen between the building aggregation system 114 and the layer 2 switch 118 and between the layer 2 switch 118 and the service emulation instance terminator 130 or service edge 112. Identifying and selecting the appropriate paths through the access network may be accomplished using an interior gateway protocol (IGP) such as the Open Shortest Path First-Traffic Engineered (OSPF-TE) approach as described in Internet Engineering Task Force's (IETF's) Request For Comments (RFCs) 2328, 2676, et al., which are incorporated herein by reference. Other routing protocols are known and may be used.

Reference numerals 244 and 246 indicate that a tunneling signaling protocol, such as the Resource Reservation Protocol (RSVP), may also be used in conjunction with other techniques during establishment of the label switched paths so that the elements involved along the path commit to allocating a specific quantity of bandwidth and other resources to support the requested flow and its performance requirements. Alternatively, it is possible to establish static LSPs wherein little or no signaling is required.

Multiprotocol label switching (MPLS) is described in documents ETF's RFCs 3031, 2702, et al. maintained by the Internet Engineering Task Force (IETF), which are incorporated herein by reference. Related to the negotiation of labels that are used in MPLS, the label distribution protocol (LDP) is described in IETF's RFC 3036, which is also incorporated herein by reference. The label distribution protocol is also discussed in IETF's Draft entitled "draft-ietf-pwe3-control-protocol-06.txt." The use of RSVP, MPLS and LDP are shown by way of example only and should not be construed as limiting the ways in which the present invention may be implemented.

The directionality of the traffic may have implications for the establishment of tunnels, service emulation instances, pseudowires, logical networking tagged paths, etc. For example, where an RSVP/LDP mechanism is used to establish label switched paths, a bi-directional link may require initiating the formation of a tunnel in one direction, originating at the building aggregation system 114, and forming the corresponding tunnel in the reverse direction by originating an RSVP request from the service emulation instance terminator 130. These tunnels will be independently formed, may have different QoS requirements, and may take different routes between the building aggregation system 114 and the service emulation instance terminator 130.

Figure 3:
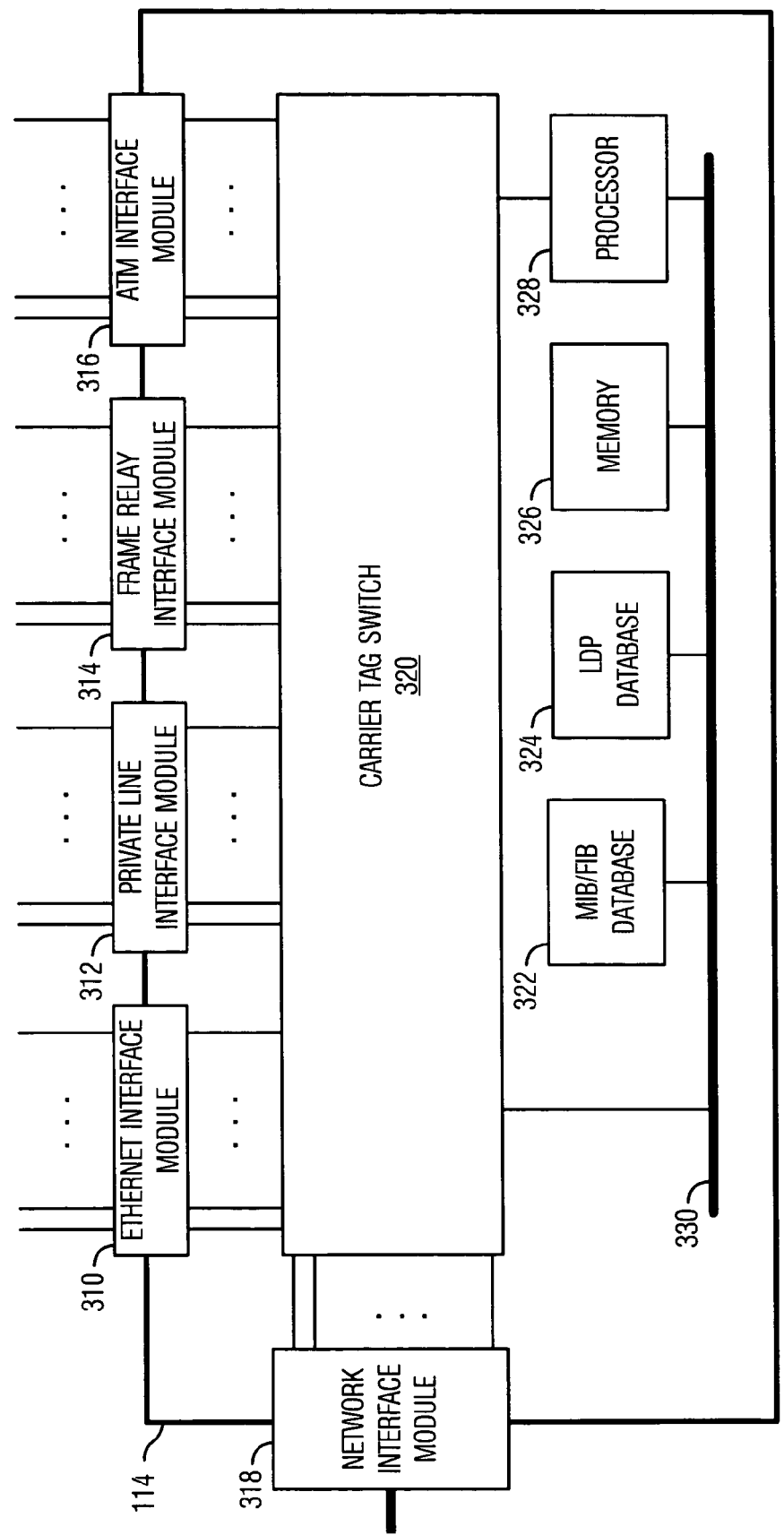
FIG. 3 is a block diagram of a building aggregation system in accordance with one embodiment of the present invention.

FIG. 3 is a block diagram of one embodiment of the building aggregation system 114 that may be utilized in accordance with one embodiment of the present invention. Preferably, the building aggregation system 114 comprises one or more CPE interface modules, such as interface modules 310-316, a network interface module 318, a carrier tag switch 320, a management information base (MIB)/forwarding information base (FIB) database 322, a label distribution protocol (LDP) database 324 when pseudowires are used as the service emulation instances, memory 326, and a processor 328. The block diagram of FIG. 3 is provided for illustrative purposes only, and accordingly, components may be added, combined, or removed without varying from the scope of the present invention.

The CPE interface modules 310-316 provide specific interfaces to a particular type of CPE, such as Ethernet interface module 310, TDM private line interface module 312, frame relay interface module 314, ATM interface module 316, and the like. Generally, each type of CPE may require a specific physical interface, such as a DS1, a twisted pair, or the like, and on each physical interface, a specific signaling or electrical property is expected. Accordingly, it is preferred that the building aggregation system 114 provide various types of interfaces and, preferably, aggregate traffic from the various types of interfaces onto one or more service emulation instances or other forms of carrier-tagged flows.

The network interface module 318 is communicatively coupled to the layer 2 switch 118 (FIG. 1) and is configured to transmit data to and receive data from the layer 2 switch 118. In the preferred embodiment, the network interface module 318 is communicatively coupled to the layer 2 switch 118 via a TDM communications link, such as a DS3, and is configured to transmit and receive data via service emulation instances, such as, for example, pseudowires, VLANs, and the like.

The carrier tag switch 320, the MIB/FIB database 322, the LDP database 324, the memory 326, and the processor 328 are preferably communicatively coupled via a bus 330. The MIB/FIB database 322 and the LDP database 324 provide storage of data structures for mapping carrier tag values, such as service emulation instance mapping identifiers, to particular flows or ports. These databases may also contain information on how to process each flow and policing parameters to be applied to the flows. These databases may also include information about a number of demarcation devices remotely managed by building aggregation system 114. The processor 328 and memory 326 provide control and storage capabilities, respectively. The processor 328 may be any general purpose or special purpose processor, such as, for example, an Application Specific Integrated Circuit (ASICs), Network Processors, Complex Instruction Set Computer (CISC), Reduced Instruction Set Computer (RISC), or the like.

The processor 328 may be communicatively coupled directly to the carrier tag switch 320 to provide routing instructions between the CPE interface modules 310-316 and the network interface module 318. Furthermore, the processor 328 may be communicatively coupled to the CPE interface modules 310-316 and/or the network interface module 318 to provide further routing and message handling instructions.

Figure 4:
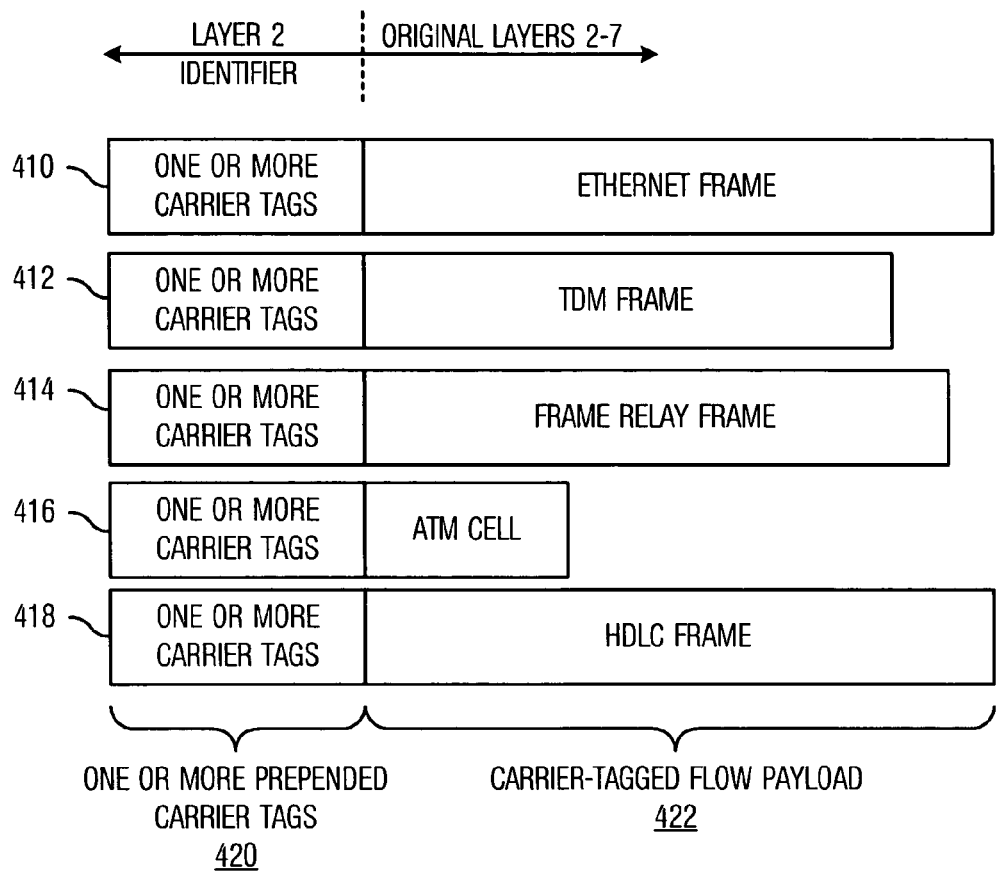
FIG. 4 is a diagram illustrating the use of a service emulation mapping identifier in accordance with one embodiment of the present invention.

In operation, the building aggregation system 114 maintains an association between a carrier tag and the port, and possibly logical flow, through which the customer's traffic is received. Thus, messages received from the CPE via the CPE interface modules 310-316 are prepended with the appropriate carrier tag to create a carrier tagged message or frame. The carrier tagged frame may be aggregated with similar frames from other flows and then transmitted to the layer 2 switch 118 (and to the service edge 112) via the network interface 318. The carrier tag, which is discussed in greater detail below with reference to FIG. 4, is a layer 2 label or identifier on which the access network 100 (FIG. 1) can switch or route the message to the appropriate location at the service edge for a given type of customer service and a given message. The carrier tag may be prepended by the CPE interface modules 310-316, the carrier tag switch 320, and/or the network interface module 318. The carrier tag may be prepended as part of an encapsulation process wherein the original customer frame is wrapped within another framing header/footer having significance to handling of the frame through the access network.

Similarly, messages received via the network interface module 318 preferably include a carrier tag value as part of an encapsulated form. The service emulation mapping identifier is mapped to a specific port and flow of one of the interface modules 310-316. The carrier tag switch 320 removes the carrier tag from the incoming messages and transmits the message to the associated CPE in the appropriate format. This process is often referred to as decapsulating.

FIG. 4 illustrates examples of data messages or frames that may be transmitted into the access network, or received from the access network, by the building aggregation system 114 in accordance with an exemplary embodiment of the present invention. Each of messages 410-418 have two portions: a carrier-tagged flow payload 422 and one or more prepended carrier tags 420. The carrier-tagged flow payload 422 represents, for example, the information as it is received from customer premise equipment at the customer site. The different types of messages shown correspond to various formats associated with a particular CPE interface, such as, for example, an Ethernet frame message 410 associated with, e.g., the Ethernet interface module 310, a TDM frame message 412 associated with, e.g., the private line interface module 312 or other TDM CPE, a frame relay frame message 414 associated with, e.g., the frame relay interface module 314, an ATM cell message 416 associated with the ATM interface module 316, or the like. Other messages, such as a high-level data link control (HDLC) frame 418, an ATM application adaptation layer 5 (AAL5) protocol data unit (PDU), or the like, may also be used. In general, the messages will usually carry various types of customer data corresponding to layers 2-7 of the OSI Reference Model.

As FIG. 4 shows, each message type may be tagged and processed in a uniform manner by the addition of one or more carrier tags. FIG. 4 reflects the format of composite messages that are sent between a building aggregation system 114, a service edge 112 and any other intervening elements. As illustrated in FIG. 4, the carrier-tagged flow payload 422 is kept substantially intact and a carrier tag 420 is prepended to the carrier-tagged flow payload 422 to prepare it for transmission through the access network. Depending on implementation, the carrier tag 420 may comprise, for example, a pseudowire label, a VLAN identifier, a tunnel label or the like. Multiple carrier tags may be stacked within a message or frame to provide for a hierarchical aggregation and routing mechanism to be implemented in the access network.

In accordance with a preferred embodiment, the building aggregator system 114, such as via interface modules 310-316, performs this carrier tagging of traffic that is received from CPE and is bound for the service edge. Likewise, building aggregator system 114 will preferably receive from the service edge messages having such carrier tags and will remove the carrier tags and distribute the messages to the appropriate CPE-side link.

It is particularly noteworthy in FIG. 4 that, regardless of message type, all of the carrier tags 420 are of uniform format. (In the case of tunnel labels, for example, messages of different types may even have the same tag value if they happen to be routed commonly.) The use of a uniform carrier tag format for all message types makes it possible for simple, generic handling of all traffic types through the access network using a uniform set of network elements that process traffic based on carrier tags. The switching elements within the access network may simply inspect the carrier tag(s) 420 of messages to determine how the message should be switched or routed without regard to message type or contents. In this manner, the access network becomes "service agnostic" and does not have to be concerned with the specifics of the protocols or addressing imbedded in the customer traffic. The generic nature of the carrier tag also allows for readily supporting any other message types not shown in FIG. 4, with little or no changes being required in the design and operation of the layer 2 switches 118 or other elements.

In some implementations, it may be desirable to prepend one or more tunnel labels (not shown) to the messages 410-418. This may be in addition to any pseudowire labels or other carrier tags already applied. A tunnel label allows a tunnel to be established throughout the access network, such as between a building aggregator and a service edge, improving scalability in the network. This mechanism may be particularly useful when many flows are to be routed to the same destination or service edge. By assigning the flows to a common tunnel, network elements, such as the layer 2 switch 118, may collectively route the service emulation instances within the tunnel by evaluating the tunnel label. In an exemplary embodiment, the tunnel label is an LSP label prepended to the messages 410-418. In accordance with the present teachings, tunnel labels may also be stacked to any degree needed to support a tunneling hierarchy, which may further facilitate efficient and scalable management of large numbers of flows.

Although the carrier-tagged flow payload 422 is shown and described as being kept essentially intact, it may be desirable in some situations to modify this original message. For example, the original message portion 422 of the Ethernet frame message 410 and the frame relay frame 414 frequently includes a frame check sequence (FCS). In many networks, the FCS is not used and may be removed. In other cases, the Ethernet frame check sequence (FCS) as received in the Ethernet frame may optionally be included, as is, rather than being deleted or recalculated by the building aggregation system 114. This can be advantageous for detecting errors or corruption of the data that might occur as the customer payload traverses the network. Another scenario involving slight modifications of payload are described below in conjunction with FIG. 5.

Figure 5:
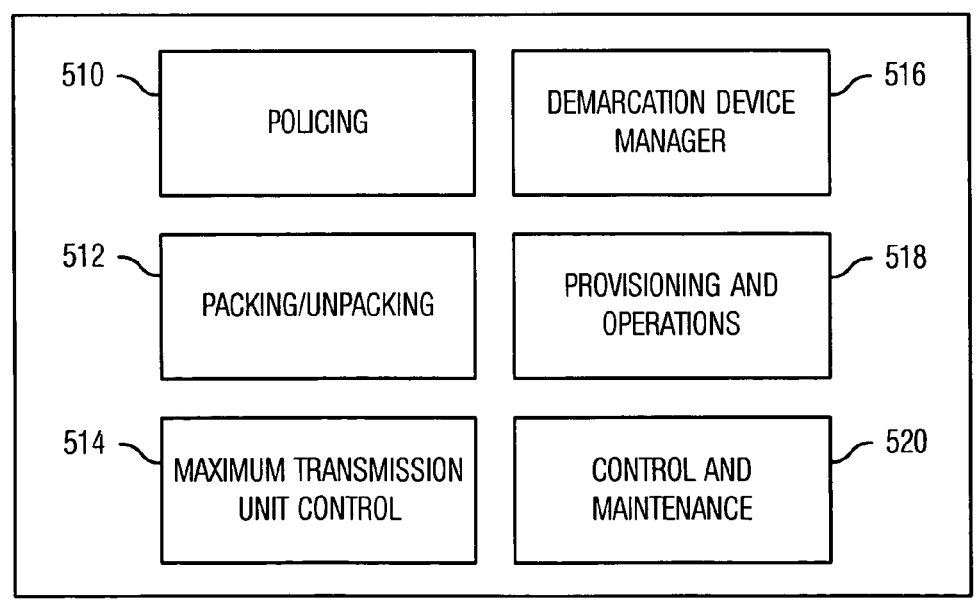
FIG. 5 is block diagram illustrating functions that may be performed by the building aggregation system in accordance with one embodiment of the present invention.

FIG. 5 illustrates some of the functions that may be performed by the building aggregation system 114 in accordance with one embodiment of the present invention. The functions described herein may be performed by software, hardware, or some combination thereof. Furthermore, the functions may be performed by one of the elements or a combination of the elements of the building aggregation system 114 discussed above with reference to FIG. 3.

For traffic originating at a CPE and bound for a service edge, a building aggregation system 114 receives messages from multiple customer CPEs, the messages being received along different physical or logical ports associated with each customer flow. The building aggregation system appends one or more carrier tags to the incoming messages and otherwise encapsulates or processes the messages to prepare them for transmission through the access network. The building aggregation system sends the carrier-tagged messages into the access network, preferably in the form of an aggregated flow over a wideband or broadband communications link. Likewise, the building aggregation system operates in a complementary manner for traffic coming from a service edge that is bound for CPE. The building aggregation system receives carrier-tagged messages that have traversed the access network, interprets the carrier tags to determine where to distribute the message, 'decapsulates' the messages to remove the carrier tags, and distributes the messages to the appropriate physical and logical ports leading to the CPE.

To properly route traffic in either direction between each CPE flow and a corresponding access tunnel, service emulation instance or logical networking tagged path, the building aggregation system may maintain an association between a customer interface port and a particular carrier tag value or set of values. Where service emulation instances are used in the access network, the building aggregation system may maintain an association between customer-facing ports and a service emulation instance mapping identifier. Where pseudowires are used in the access network, the building aggregation system may maintain an association between customer-facing ports and a pseudowire label value. One or more tunnel labels or LSP labels may also be associated with customer ports, either directly or indirectly by association with pseudowires or service emulation instances. Any of these associations may be maintained, for example, in a look-up table which may be referred to as a management information base (MIB) or a forwarding information base (FIB). As described elsewhere herein, these associations may be established by negotiation or coordination with other access networks elements or by control applied to the building aggregation system by a provisioning system. The building aggregation system also performs functions related to controlling traffic volumes and related to remotely managing demarcation devices.

As depicted in FIG. 5, the functions of a building aggregation system include a policing function 510, a packing/unpacking function 512, a maximum transmission unit (MTU) control 514, a demarcation device manager 516, a provisioning and operations function 518, and a control and maintenance function 520.

The policing function 510 is responsible for monitoring a user's traffic and controlling the rate at which customer traffic enters the access network. Policing function 510 may involve marking or dropping of customer packets or frames which exceed configured threshold values. Dropping or discarding of packets may occur when traffic from the customer exceeds a maximum data rate. Packets that represent an excessive data rate are simply not forwarded to the access network. When this happens, the policing function 510 may notify the CPE of the data loss, whereupon the CPE may throttle back or take action to recover from the lost data. The building aggregation system may also engage in customary flow control coordination with CPE to regulate incoming data rates of flows, for example, using "pause" or "ready to receive" control messages of some nature that are well known among those of ordinary skill in the art.

In contrast to dropping of packets, marking relates to designating which packets, if any, may be dropped later during transmission if the network or a network element becomes too busy to handle all of the user's traffic. Generally, a user contracts with a service provider for a guaranteed minimum data rate, as well as an absolute maximum or "burstable" rate that may be supported as long as the network is not too congested to handle it. At times, the user may attempt to send traffic at a rate in excess of the guaranteed rate. While the network may generally accommodate the higher data rate in these situations, it is desirable to set a discard eligibility bit in the message header. This allows downstream network elements to selectively discard some of the user's traffic if they are overburdened with other network traffic. In accordance with a preferred embodiment, the least significant bit (LSB) within the Experimental field of an MPLS label maybe used to indicate discard eligibility. In effect, when a customer has exceeded a guaranteed data rate and begins to experience data loss due to network congestion, the customer may reduce data rate or take other measures until the network congestion subsides. In some cases, transport protocols operating within CPE may sense the data loss and may automatically perform flow control to effectively reduce the data rate. A marking process which may be performed as part of policing function 510 is discussed in greater detail below with reference to FIG. 6. Policing function 510 may also encompass metering or rate limiting to adjust the timing of forwarding of packets for better control of variable rate traffic.

In accordance with a preferred embodiment of the present invention, policing of customer traffic may extend across multiple service types and multiple logical or physical ports. For example, a customer may contract for two individual flows having certain committed minimum and maximum burstable rates. The QoS measures implemented in the building aggregation system may also control the sum of the two flows to remain below a certain limit, even if the flows are of different types or enter the building aggregation system along different ports. Minimum and maximum rates may even be applied in a hierarchical nature, for example, by company, department, employee, device, service type or specific flow.

The packing/unpacking function 512 provides the necessary reformatting of traffic necessary to convert traffic between a form suitable to the CPE and a form suitable for transmission through the access network. As described elsewhere herein, this function may encompass encapsulation and adding of carrier tags as well as the complementary processes of decapsulation and removal of carrier tags. This function may also relate to removal of extraneous data or fields that are part of a native data link protocol but are unnecessary for transport in an encapsulated form through the access network. For example, an HDLC frame received in a bit stream from a CPE will contain flags to delimit the endpoints of the frame, as well as possibly some stuffing bits. Prior to traversing the access network, these aspects may be removed.

Another possible role of packing/unpacking function 512 relates to terminating TDM links from CPE that are used to carry packet, frame or cell data. For example, a frame relay customer (such as customer 116c in FIG. 1) may use a DS1 link to communicate frame relay traffic to the building aggregation system. In practice, the frame relay traffic from the CPE 116c, although passing through a DS1 line in the building riser, may be extracted as frame relay frames by the packing/unpacking function 512 and coupled into, for example, FR-type service emulation instances across the access network. This is more efficient than passing the FR-laden DS1 communications, as such, in a TDM-type service emulation instance through the access network. The DS1 circuit would unnecessarily reserve a constant bit rate bandwidth at all times whereas carrying the frame relay traffic allows for multiplex gains, including statistical multiplexing.

Yet another possible role of packing/unpacking function 512 relates to adapting packet size or frame size of received traffic to a size that is amenable or preferable for transport over the access network. For example, with due regard to latency considerations, multiple 53-byte ATM cells may be concatenated and delivered within a single frame across the access network. It is also conceivable that large customer-submitted packets might be split into smaller packets or frames before being sent through the access network.

Of course, with all of the manipulations just described, another entity that eventually receives the traffic may need to perform complementary actions to reconstitute a flow in its native form. Where the building aggregation system 114 is a recipient of flows that have been affected in this manner, packing/unpacking function 512 may need to perform the complementary reconstitution processes.

The MTU transmission control function 514 is a function that monitors whether the maximum transmission size is exceeded. The MTU transmission control function 514 is discussed in greater detail below with reference to FIG. 7.

The demarcation device manager 516 may provide a variety of functions related to the management and control of CPE and/or demarcation devices. Demarcation device manager 516 may also provide diagnostic capabilities, such as loopback testing, transmitting test messages/patterns, monitoring the connectivity between the demarcation device (and possibly the CPE) and the building aggregation system 114.

The provisioning and operations function 518 provides the ability to provision service emulation instances and the mapping between CPE flows and the service emulation instances. Generally, a control and maintenance system (not shown) preferably provides provisioning commands to the building aggregation system 114, which allocates the necessary resources and maintains a correlation between CPE flows and the virtual circuit. The correlation is preferably maintained via a service emulation mapping identifier such as a pseudo-wire label, a VLAN tag, or the like. The association between a CPE flow and the service emulation mapping identifier may be maintained by, for example, a table stored in memory. Additionally, the bandwidth and QoS associated with each service emulation instance mapping identifier is also specified and correlated to each service emulation instance via the provisioning and operations function 518.

The control and maintenance function 520 provides management and control functionality for the building aggregation system 114, such as provisioning, operations, maintenance, performance monitoring, and the like. Preferably, the control and maintenance function 520 utilizes an in-band control and maintenance flow. In this manner, a remote control system (not shown) may utilize existing communications links without the need of providing a separate communications link solely for control and maintenance functions.

Figure 6:
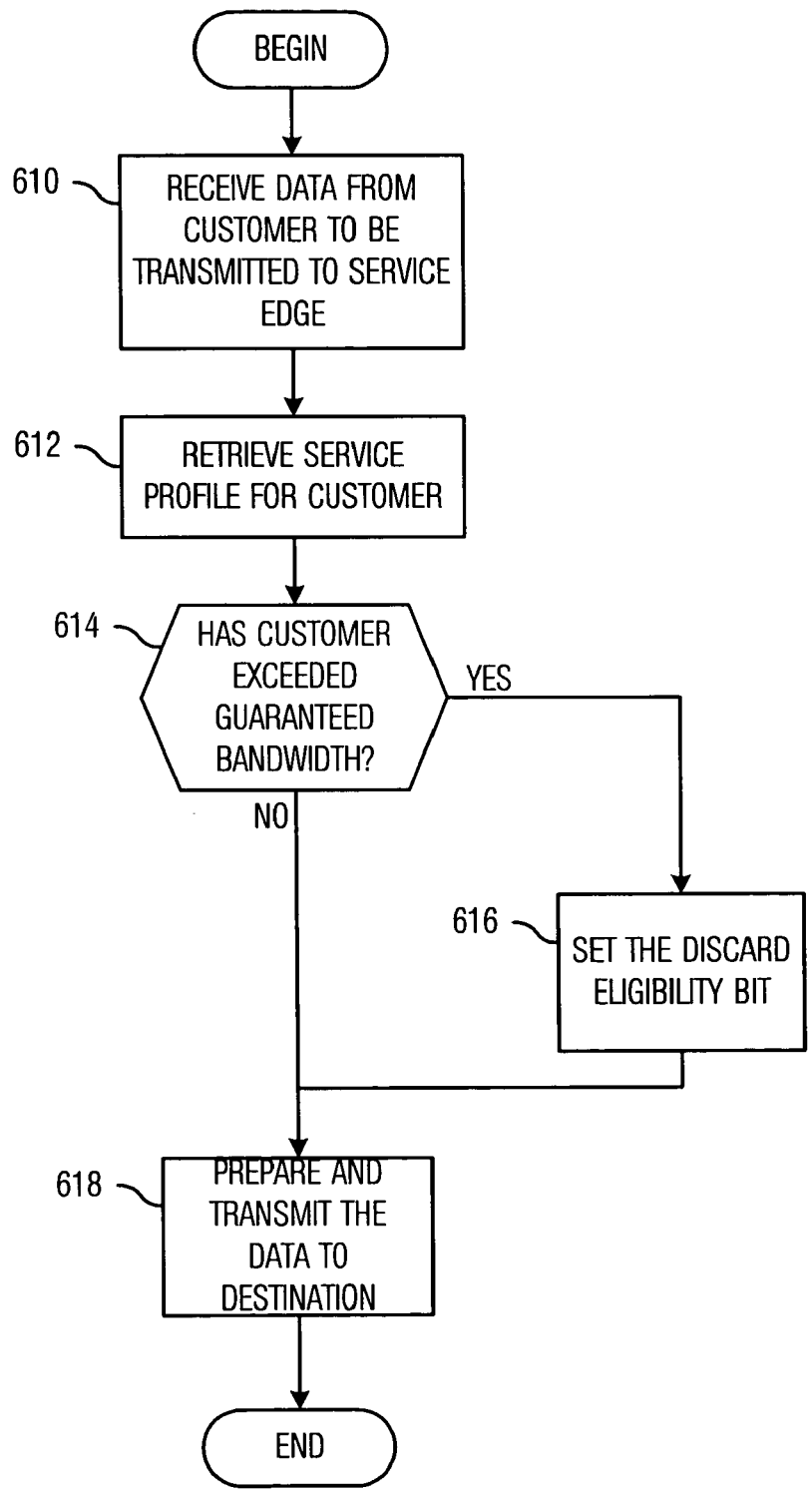
FIG. 6 is a diagram depicting a process that may be performed to police the bandwidth used by a customer in accordance with one embodiment of the present invention.

FIG. 6 is a diagram depicting a marking process that may be performed by the policing function 510 (FIG. 5) of building aggregation system 114 in accordance with an embodiment of the present invention. The process begins in step 610, wherein a unit of data traffic, such as a data frame, is received from CPE via one of the CPE module interfaces 310-316 (FIG. 3). As discussed above, the data may be received from a variety of CPE, such as a frame relay, an Ethernet client, an ATM, a private line customer, or the like.

In step 612, a service profile for the customer is retrieved from memory or other data storage devices. The service profile describes attributes of services to which the customer is subscribed. Each service may have its own requirements, such as a guaranteed or 'committed' minimum data rate that the service provider promises to make available at all times. The guaranteed amount of bandwidth as specified in the service profile is compared to the bandwidth currently being consumed by the customer in step 614.

If a determination is made in step 614 that the data is in excess of the guaranteed data rate as specified in the service profile, then execution proceeds to step 616, wherein a discard eligibility bit is set to indicate to downstream network elements that the data frame may be regarded as discardable if the network is busy or heavily congested. In accordance with a preferred embodiment of the present invention, a discard eligibility indication may even be applied to traffic types which lack an equivalent attribute in the native protocol. For example, the least significant bit (LSB) within the Experimental field of an MPLS label maybe used to indicate discard eligibility. Thus, consistent QoS measures may be extended to flows of all types.

Those of ordinary skill in the art will recognize how steps 614 and 616 may actually be implemented using a "token bucket" approach or other techniques to discern data frames that represent excess beyond a certain volume per unit time. Policing or rate limiting of customer flows may also take into account a maximum burst duration that may be configured for a flow according to a service profile that describes the flow attributes.

Whether or not step 616 is performed responsive to the determination in step 614, processing proceeds to step 618, wherein the data is prepared and transmitted to the service edge 112 via the associated carrier-tagged flow. Preparation of the data for transmission may include, for example, formatting the data for transport via a TDM communications link or a packet-based communications link, identifying the correct carrier-tagged flow that is to carry the data associated with the data, appending a carrier tag to the data, and other processing as described herein. One process that may be used to prepare and transmit data is discussed below with reference to FIG. 10.

Figure 7:
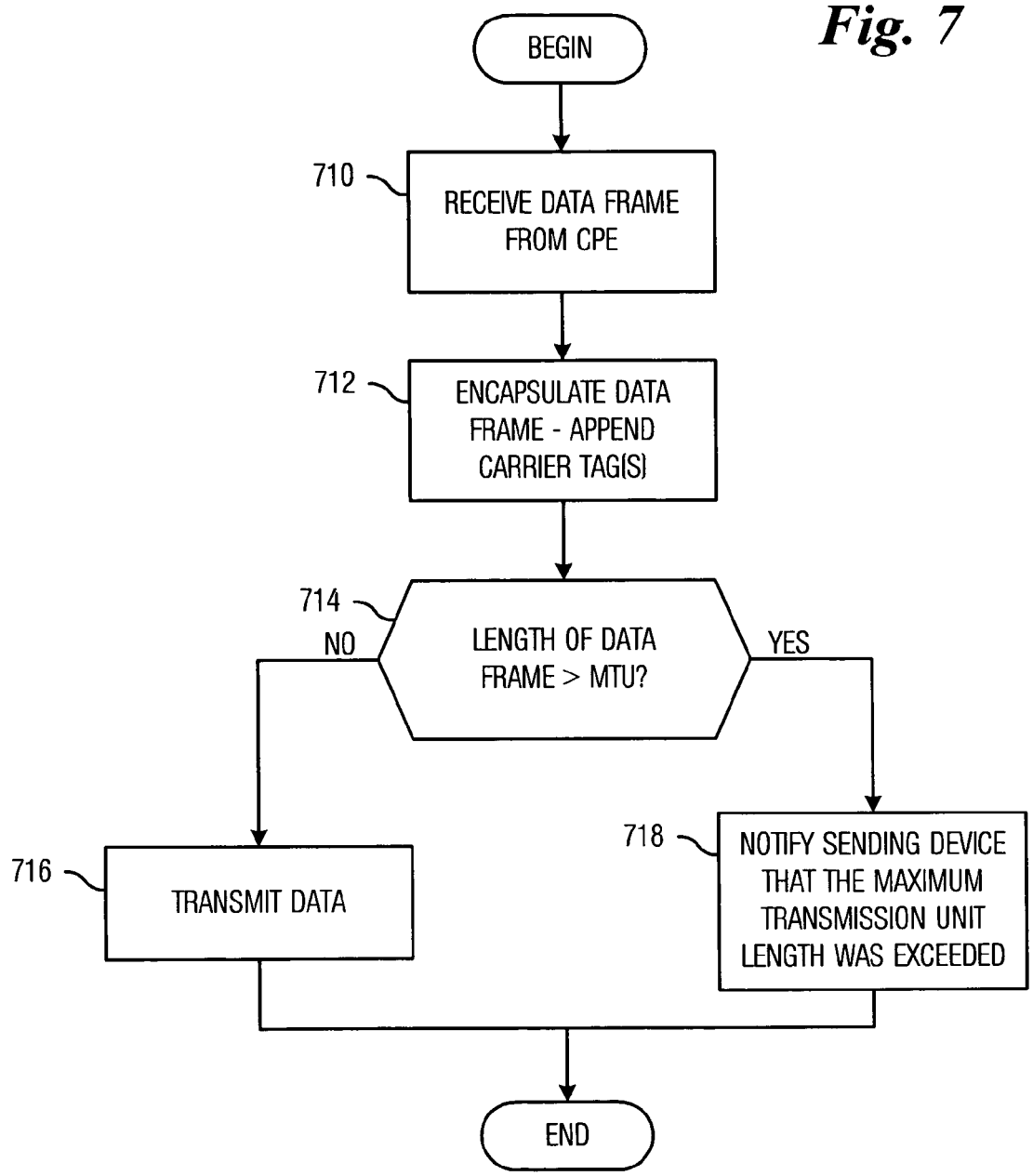
FIG. 7 is a diagram depicting a process that may be performed to pack/unpack messages received by the building aggregation system in accordance with one embodiment of the present invention.

FIG. 7 is a diagram of a process that may be performed by the maximum transmission unit control function 514 (FIG. 5) in accordance with an embodiment of the present invention. The process begins in step 710, wherein a unit of customer data traffic, such as a data frame, that is to be transmitted via a carrier-tagged path is received from the CPE. The data may be data received from any one of various types of CPE, such as frame relay, Ethernet, ATM, private line customer, and the like.

In step 712, the data frame received from the CPE is modified by the addition of one or more carrier tags and any other overhead bits or fields that may be necessary for encapsulation and transport through the access network. Due to the added tags and other fields, the modified data frame may be somewhat larger than the original data frame received from the CPE. Accordingly, in step 714, a determination is made whether or not the length of the modified data exceeds the maximum transmission unit (MTU) length of the transport protocol. The maximum transmission unit size may be configured to reflect the limits of the packet-switched network through which tunnels or service emulation instances have been implemented across the access network. In an alternative approach, it may be possible to determine, before actually modifying the data frame, whether the MTU would be exceeded by the addition of encapsulation information.

If it is determined in step 714 that the MTU has not been exceeded by the addition of carrier tags, etc., then the modified data frame is transmitted as indicated by step 716. If, on the other hand, a determination is made in step 714 that the length of the modified data frame exceeds the maximum transmission unit length, then processing proceeds to step 718, wherein the transmitting device, e.g., the sending CPE, is notified of the invalid length. It may be preferable in some implementations to make this determination as early as possible, especially with forehand knowledge of the limits of the underlying packet transport, rather than simply forwarding the enlarged data frame and relying on other network elements to detect and handle the MTU violation. Protocols are well known by which CPE, upon receiving the failure notification either from the building aggregation system or other elements downstream, may automatically reduce the size of packets or data frames submitted for transmission. As another alternative, it may be also possible to react to a large data frame from a customer by dividing the frame into multiple smaller frames prior to transmission through the access network.

Figure 8:
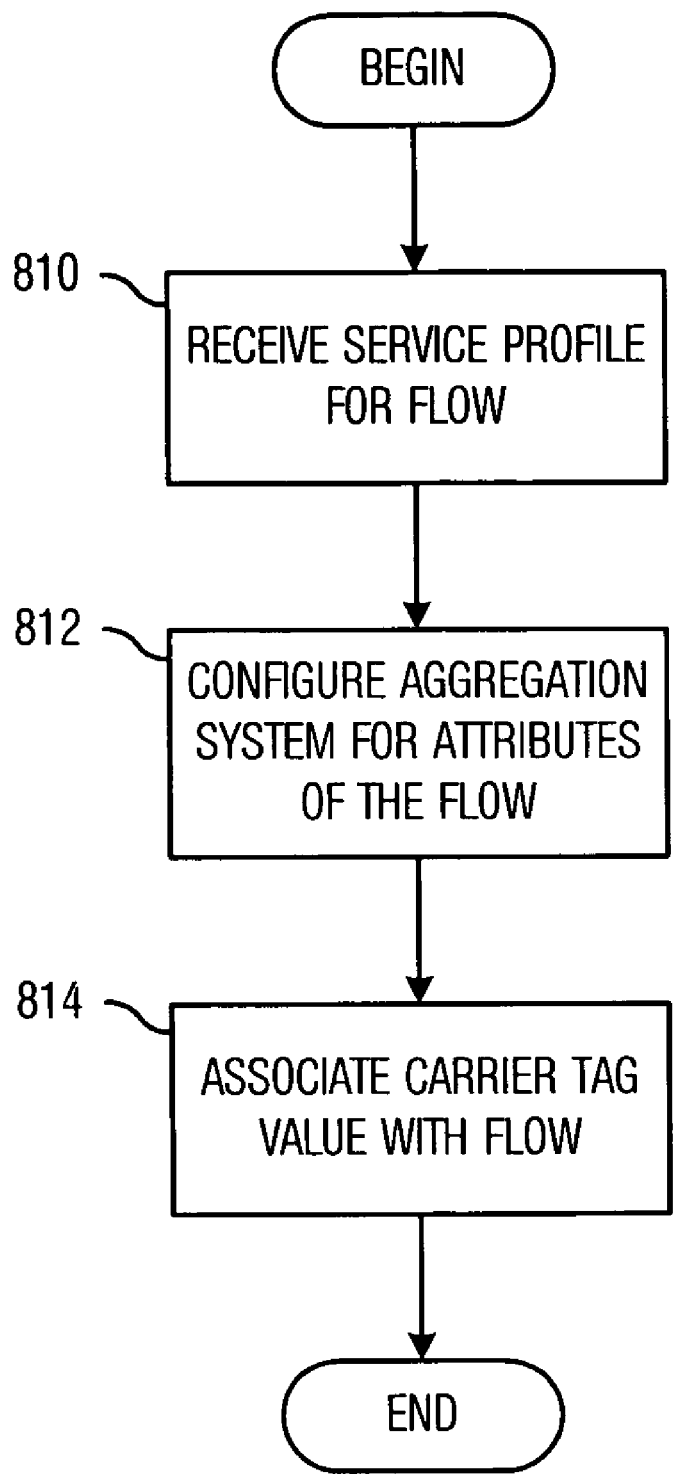
FIG. 8 is a diagram depicting a process that may be performed to monitor the maximum transmission unit length in accordance with one embodiment of the present invention.

FIG. 8 is a data flow diagram of steps that may be performed to provision system resources in accordance with one embodiment of the present invention. The process begins in step 810, wherein the building aggregation system 114 receives a service profile describing the attributes of a customer flow that is to be handled by the access network. The service profile may be a new service profile corresponding to, for example, a new customer or a new customer service, or the service profile may be an update to an existing service profile. The building aggregation system may store some or all of the service profile in a memory or persistent data storage of some nature so that it may be retrieved as needed. Preferably, the service profile includes an identification of a CPE flow, the service characteristics, and the like.

The service profile may or may not also include one or more carrier tags, such as service emulation instance mapping identifiers, to be associated with the flow. That is, the service profile may include carrier tags if, for example, the binding of carrier tags to flows has been decided externally by a provisioning or control system and the service profile is a form of command or instruction to cause the building aggregation system to enact the binding in its forwarding information base. Alternatively, the service profile may primarily identify and describe a flow, whereas any carrier tags to be associated with the flow are decided separately by signaling or other coordination between the building aggregation system and other network elements or control functions.

Within the service profile, the CPE flow may be identified by a flow identifier, shelf/card/port/flow identifiers, or other means for identifying which flow or flows are being provisioned. The service characteristics may include a guaranteed bandwidth, a burstable bandwidth, class-of-service or quality-of-service parameters, or the like.

In step 812, the building aggregation system is configured for the attributes of the flow as set forth in the service profile. This may involve, for example, setting policing thresholds in memory registers at specific ports so that policing logic in the ports operates the control the flows as specified in the service profile. This configuring may also involve setting marking values that will be used to mark data frames as belonging to a priority classification, quality of service, class of service, etc.

In step 814, carrier tags are associated with the subject flow that is identified and described in the received service profile. This action may involve, for example, populating a table or information base to reflect the pairing of a carrier tag value with corresponding flow identifying value. In one embodiment, the association may be stored in memory, such as memory 326 (FIG. 3). As mentioned earlier, the carrier tag value(s) to be associated with the flow may included in the service profile received in step 810 or may be determined by other mechanisms. Where service emulation instances, such as pseudowires, are employed, steps 812 and 814 may entail creating or selecting a pseudowire instance having a particular emulated service type and associating its service emulation instance mapping identifier with the subject customer flow.

Once the process of FIG. 8 has been performed, the building aggregation system 114 is prepared to receive data flow from a customer and to send the flow along the access network applying the appropriate encapsulation, tagging, marking and policing on the flow. In other words, the building aggregation system is now prepared for handling actual traffic from the CPE using the process described next in conjunction with FIG. 9.

Figure 9:
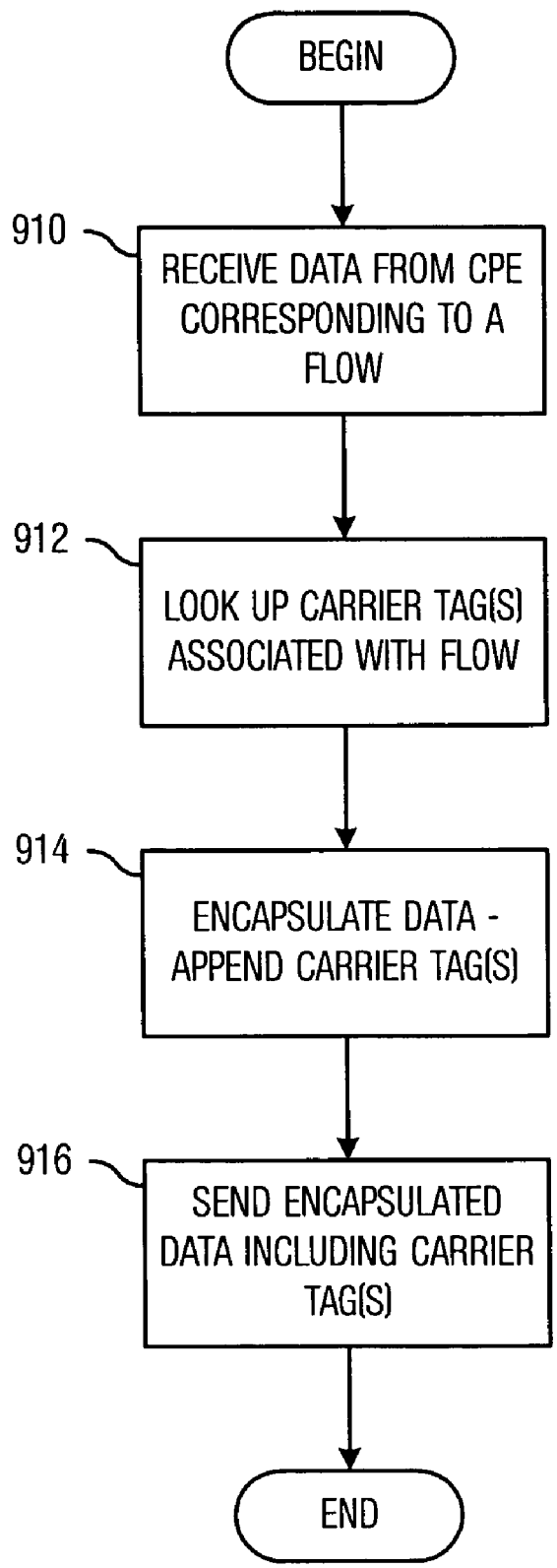
FIG. 9 is a diagram depicting a process that may be performed to provision a service in the building aggregation system in accordance with one embodiment of the present invention.

FIG. 9 is a diagram depicting a process that may be performed by the building aggregation system 114 to transmit data received by the CPE 116 to the service edge 112 in accordance with one embodiment of the present invention. The processing begins in step 910, wherein the building aggregation system 114 receives data from a transmitting CPE via one of the CPE interface modules 310-316. On each physical connection, multiple logical flows may be supported. It is possible to assign a carrier tag for all traffic received via a given physical port, resulting a "port-mode" encapsulation. Otherwise, each logical flow may be associated with a separate carrier tag value. Accordingly, in step 912, the building aggregation system 114 determines, such as by looking up a value in a table that might have been established earlier in step 814 of FIG. 8, which carrier tag value(s) apply to the flow through which the data was received in step 910. This may be a function of the physical port or the specific logical flow within the port.

In step 914, the data received from the CPE is prepared for transmission via a carrier-tagged path through the access network. As described earlier, this step includes adding encapsulation headers/footers with carrier tag fields, as well as payload modifications or reframing as needed. In the case where carrier tags may be stacked to support nesting of tunnels or paths, the building aggregation system may be required to apply or "push" multiple carrier tags. Thereafter, the modified data is transmitted via the network interface module 318 such that the traffic is associated with the corresponding carrier-tagged path.

Figure 10:
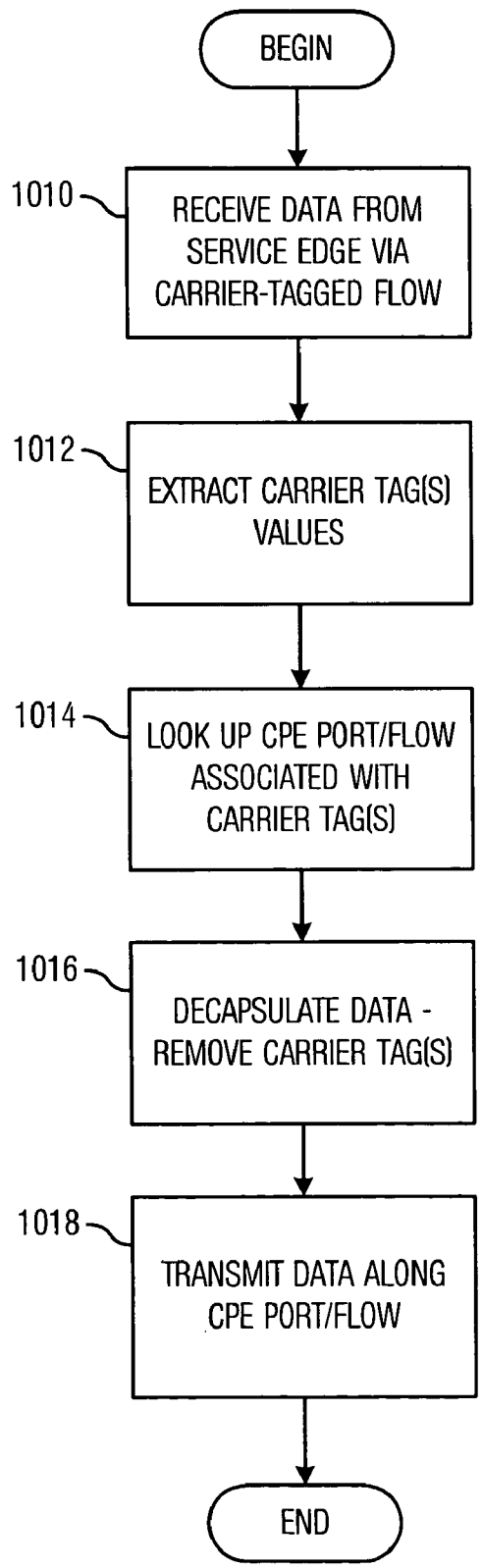
FIG. 10 is a diagram depicting a process that may be performed to receive traffic from customer premise equipment and transmit the traffic to a service edge in accordance with one embodiment of the present invention.

FIG. 10 is a diagram depicting a process that may be performed by the building aggregation system 114 to process and forward data received from the service edge 112 to the CPE. The process begins in step 1010, wherein data is received from the service edge 112 via a carrier-tagged path, such as a service emulation instance. In step 1012, carrier tag information is extracted from the data traffic received from the service edge. This involves parsing through the encapsulation header present in the received data, identifying the relevant fields and reading the values contained in these fields. This extracting step may also be performed in combination with a label "popping" or decapsulation step similar to step 1016 explained below.

In step 1014, the carrier tag information is used to determine the corresponding flow to the CPE. In the preferred embodiment, the flow is determined by consulting a look up table, which may be maintained in memory 326 or the like present and which may have been populated in an action such as step 814 of FIG. 8. This look up maps the carrier tag information to a flow identifier(s) that uniquely identifies the CPE interface and flow. The CPE interface and flow may be specified by one or more of a shelf identifier, a card identifier, a port identifier, and a flow identifier. Other methods, however, may be used.

Next, in step 1016, the encapsulation fields present in the received data are removed and any other appropriate steps are taken to render the data in a form suitable to be passed to the CPE. In the case where carrier tags may be stacked to support nesting of tunnels or paths, the building aggregation system may be required to remove or "pop" multiple carrier tags. Preparing traffic for transmission to CPE may also involve reconstituting the traffic by refragmentation/defragmentation of packets or frames, reinsertion of stuffing bits or frame flags, FCS manipulations. Through some interfaces, the traffic may need to be packaged for transmission along a DS1 link in a building riser. In step 1018, the data is transmitted to the appropriate CPE (as determined in step 1014) via the associated CPE interface module 310-316.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method comprising:
   receiving, at a layer 2 switch, a first carrier-tagged traffic flow from a service edge via a first label switched path, wherein the first carrier-tagged traffic flow has a first carrier tag;
   identifying, at the layer 2 switch, a second label switched path based on a flow identifier included with the first carrier tag of the first carrier-tagged traffic flow, where the flow identifier comprises a pseudo-wire tag or a virtual local area network (VLAN) tag;
   removing the flow identifier, by the layer 2 switch, from the first carrier tag of the first carrier-tagged traffic flow; and
   switching the first carrier-tagged traffic flow after assigning a new carrier tag without the flow identifier to a first building aggregation system, for aggregating a plurality of different services, from the layer 2 switch via the second label switched path, wherein the first label switched path and the second label switched path are multiprotocol label switching (MPLS) label switched paths.

2. The method of claim 1, wherein the flow identifier comprises a VLAN tag in accordance with 802.1q.

3. The method of claim 1, wherein the flow identifier comprises a pseudo-wire tag.

4. The method of claim 1, wherein the flow identifier further comprises a tunnel label.

5. The method of claim 1, wherein the flow identifier includes multiple flow identifiers that are stacked.

6. The method of claim 1, further comprising:
receiving, at the layer 2 switch, a second carrier-tagged traffic flow from the service edge via the first label switched path;
identifying, at the layer 2 switch, a third label switched path based on a second flow identifier included with the second carrier-tagged traffic flow;
removing the second flow identifier from the second carrier-tagged traffic flow; and
switching the second carrier-tagged traffic flow to a second building aggregation system from the layer 2 switch via the third label switched path.

7. A computer-implemented method comprising:
receiving a first carrier-tagged traffic flow on a first label switched path between a service edge and a building aggregation system that aggregates a plurality of different services, wherein the first carrier-tagged traffic flow has a first carrier tag;
determining a first flow identifier associated with the first carrier tag of the first carrier-tagged traffic flow, where the first flow identifier comprises a pseudo-wire tag or a virtual local area network (VLAN) tag;
identifying a second label switched path between a layer 2 switch and one of the service edge or the building aggregation system based on the first flow identifier; and
transmitting the first carrier-tagged traffic flow on the second label switched path with the first flow identifier, wherein the first label switched path and the second label switched path are multiprotocol label switching (MPLS) label switched paths.

8. The method of claim 7, further comprising:
receiving a second carrier-tagged traffic flow with a second flow identifier on the second label switched path between a layer 2 switch and one of the service edge or the building aggregation system;
identifying the first label switched path based on the second flow identifier; and
transmitting the second carrier-tagged traffic flow on the first label switched path without the second flow identifier.

* * * * *